(12) United States Patent
Magerstedt et al.

(10) Patent No.: US 6,268,418 B1
(45) Date of Patent: Jul. 31, 2001

(54) MINERAL FILLED MOULDING COMPOUNDS BASED ON POLYALKYLENE-TEREPHTHALATE

(75) Inventors: Herbert Magerstedt, Moers; Georg Heger; Karsten-Josef Idel, both of Krefeld; Friedemann Paul, Bergisch Gladbach, all of (DE)

(73) Assignee: Bayer AG, Leverkusen (DE)

( * ) Notice: Subject to any disclaimer, the term of this patent is extended or adjusted under 35 U.S.C. 154(b) by 1012 days.

(21) Appl. No.: 08/681,613

(22) Filed: Jul. 29, 1996

Related U.S. Application Data

(63) Continuation of application No. 08/447,226, filed on May 22, 1995, now abandoned.

(30) Foreign Application Priority Data

Jun. 3, 1994 (DE) ................................ 44 19 569

(51) Int. Cl.[7] .................................................. C08L 67/02
(52) U.S. Cl. .................... 524/125; 524/126; 524/127; 524/141; 524/143; 524/424; 524/425; 524/504; 524/513; 524/605
(58) Field of Search .................................. 524/127, 125, 524/126, 141, 143

(56) References Cited

U.S. PATENT DOCUMENTS

| | | |
|---|---|---|
| 3,830,771 | 8/1974 | Cohen et al. . |
| 4,180,494 | * 12/1979 | Fromuth .................. 525/63 |
| 4,203,888 | * 5/1980 | Rashbrook ................ 524/127 |
| 5,135,973 | * 8/1992 | Fukasawa ................. 524/94 |
| 5,175,204 | * 12/1992 | Orikasa ................... 524/504 |
| 5,298,547 | * 3/1994 | Gareiss ................... 524/425 |

FOREIGN PATENT DOCUMENTS

| | | |
|---|---|---|
| 25 09 592 | 9/1975 | (DE) . |
| 264 143 | 4/1988 | (EP) . |
| 362 623 | 4/1990 | (EP) . |
| 324 356 | 7/1990 | (EP) . |
| 386 916 | 9/1990 | (EP) . |
| 491 986 | 7/1992 | (EP) . |
| 496 240 | 7/1992 | (EP) . |
| 594 021 | 4/1994 | (EP) . |
| 58-76447 | 2/1981 | (JP) . |
| WO 92/11314 | 7/1992 | (WO) . |

OTHER PUBLICATIONS

*The Condensed Chemical Dictionary* 6th Edition p. 690, Reinhold Publishing Co. 1961.*
Derwent Database, JP 05 070 671 (Mar. 23, 1993).

* cited by examiner

*Primary Examiner*—Patricia A. Short
(74) *Attorney, Agent, or Firm*—Connolly Bove Lodge & Hutz LLP

(57) ABSTRACT

Thermoplastic moulding compounds containing

A) 30 to 99 parts by wt. of polyalkyleneterephthalate
B) 0 to 50 parts by wt. of polycarbonate
C) 0 to 30 parts by wt. of a graft polymer
D) 0.1 to 20 parts by wt. of an oligomeric phosphorus compound of the formula (Ia)

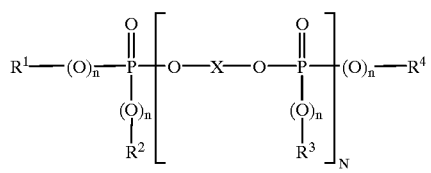

(Ia)

or 0.1 to 20 parts by weight of a mixture of an oligomeric phosphorus compound of the formula (Ia) and a phosphorus compound of the formula (Ib)

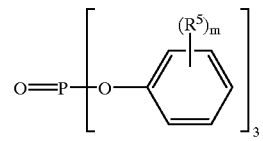

where the amount of phosphorus compound of the formula (Ib) in the mixture of phosphorus compounds is 1 to 50% by weight (relative to 100% by weight of phosphorus compound of the formula (Ia) and (Ib), E1) 1 to 60 parts by wt. of mineral filler and
E2) 0 to 30 parts by wt. of fillers and reinforcing materials which differ from E1).

3 Claims, No Drawings

MINERAL FILLED MOULDING COMPOUNDS BASED ON POLYALKYLENE-TEREPHTHALATE

This application is a continuation, of application Ser. No. 08/447,226 filed on May 22, 1995, now abandoned.

The invention relates to thermoplastic moulding compounds based on polyalkyleneterephthalate, an oligomeric phosphorus compound, mineral fillers and optionally an aromatic polycarbonate and/or a graft polymer.

As is known, for example, from WO 92/11314, a high flame-proofing effect is achieved by using resorcinol diphosphate in a polymer blend consisting of PBT/aromatic polycarbonate or PBT/polyetherimide.

Furthermore, EP-A 264 143 describes hindering the formation of agglomerates in aromatic polyesters by adding diphosphates. DE-OS 2 509 592 and JP 58-76447 describe polyester compositions which contain organic diphosphates.

The present invention provides a thermoplastic moulding compound based on polyalkyeneterephthalate, wherein the moulded bodies or moulded items obtainable therefrom are distinguished by high toughness and extensibility.

It was found that high toughness, with simultaneous good flow behaviour and good other properties, without damaging the thermoplastic matrix, is produced with a mineral-filled polyalkyleneterephthalate to which is added resorcinol diphosphate.

The present invention provides thermoplastic moulding compounds containing

A) 30 to 98.9 parts by wt. of polyalkyleneterephthalate
B) 0 to 50 parts by wt. of polycarbonate
C) 0 to 30 parts by wt. of a graft polymer
D) 0.1 to 20 parts by wt. of an oligomeric phosphorus compound of the formula (Ia)

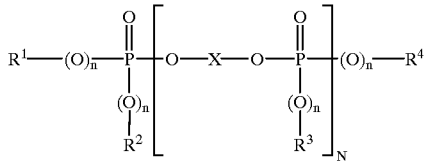

in which
$R^1$, $R^2$, $R^3$, $R^4$, independently of each other, represent a $C_1$–$C_8$-alkyl, $C_5$–$C_6$-cycloalkyl, $C_6$–$C_{10}$-aryl or $C_7$–$C_{12}$-aralkyl group,
n may be 0 or 1, irrespective of the position,
N is an average number from 0.5 to 5 and
X represents a mono or polynuclear aromatic group with 6 to 30 carbon atoms,
or 0.1 to 20 parts by weight of a mixture of an oligomeric phosphorus compound of the formula (Ia) and a phosphorus compound of the formula (Ib)

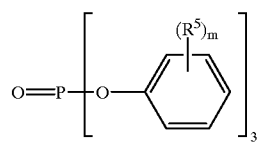

in which
$R^5$ is methyl and m is a number of 0 to 5,
where the amount of phosphorus compound of the formula (Ib) in the mixture of phosphorus compounds is 1 to 50% by weight, preferably 3 to 45% by weight and in particular 5 to 40% by weight (relative to 100% by weight of the phosphorus compound of the formulae (Ia) and (Ib)).

E1) 1 to 60 parts by wt. of mineral filler and
E2) 0 to 30 parts by wt. of fillers and reinforcing materials which differ from E1).

In the event that the thermoplastic moulding compounds contain the components A), B), D) and E), the following compositions are preferred:

A) 30 to 92, in particular 65 to 90 parts by wt. of polyalkyleneterephthalate,
B) 1 to 50, in particular 5 to 30 parts by wt. of polycarbonate,
D) 1 to 20, in particular 3 to 15 parts by wt. of an oligomeric phosphorus compound of the formula (Ia) or a mixture of phosphorus compounds of the formulae (Ia) and (Ib),
E1) 1 to 60, in particular 3 to 55, and quite specifically 20 to 55 parts by wt. of mineral filler and optionally
E2) 1 to 20, in particular 5 to 15 parts by wt. of fillers and reinforcing materials which differ from E1).

In the event that the thermoplastic moulding compounds contain the components A), D) and E), the following compositions are preferred:

A) 20 to 96, in particular 40 to 55 parts by wt. of polyalkyleneterephthalate,
D) 3 to 20, in particular 5 to 15 parts by wt. of an oligomeric phosphorus compound of the formula (Ia) or a mixture of phosphorus compounds of the formulae (Ia) or (Ib),
E1) 1 to 60, in particular 25 to 55 parts by wt. of mineral filler and optionally
E2) 1 to 20, in particular 5 to 15 parts by wt. of fillers and reinforcing materials which differ from E1).

In the event that the thermoplastic moulding compounds contain the components A), B), C), D) and E), the following compositions are preferred:

A) 30 to 97, in particular 42 to 90 parts by wt. of polyalkyleneterephthalate,
B) 1 to 50, in particular 5 to 30 parts by wt. of polycarbonate,
C) 5 to 30, in particular 5 to 25 parts by wt. of a graft polymer,
D) 1 to 20, in particular 3 to 15 parts by wt. of an oligomeric phosphorus compound of the formula (Ia) or a mixture of phosphorus compounds of the formulae (Ia) and (Ib),
E1) 1 to 60, in particular 3 to 55 parts by wt. and optionally
E2) 5 to 20, in particular 5 to 15 parts by wt. of fillers and reinforcing materials which differ from E1).

Component A

Polyalkyleneterephthalates in the sense of the invention are reaction products of aromatic dicarboxylic acids or their reactive derivatives (e.g. dimethyl esters or anhydrides) and aliphatic, cycloaliphatic or araliphatic diols and mixtures of these reaction products.

Preferred polyalkyleneterephthalates can be prepared from terephthalic acid (or its reactive derivatives) and aliphatic or cycloaliphatic diols with 2 to 10 carbon atoms by known methods (Kunststoff-Handbuch, vol. VIII, p. 695 et seq., Karl-Hanser Verlag, Munich, 1973).

Preferred polyalkyleneterephthalates contain at least 80, preferably 90 mol-%, with respect to the dicarboxylic acid component, of terephthalic acid groups and at least 80, preferably at least 90 mol-%, with respect to the diol component, of ethylene glycol and/or butanediol-1,4 groups.

The preferred polyalkyleneterephthalates may contain, in addition to terephthalic acid groups, up to 20 mol-% of groups from other aromatic dicarboxylic acids with 8 to 14 carbon atoms or aliphatic dicarboxylic acids with 4 to 12 carbon atoms, such as groups from phthalic acid, isophthalic acid, naphthalene-2,6-dicarboxylic acid, 4,4'-di-phenyl-dicarboxylic acid, succinic, adipic, sebacic, azelaic acids or cyclohexanediacetic acid.

The preferred polyalkyleneterephthalates may contain, in addition to ethylene glycol or butanediol-1,4-groups, up to 20 mol-% of other aliphatic diols with 3 to 12 carbon atoms or cylcoaliphatic diols with 6 to 21 carbon atoms, e.g. groups from propanediol-1,3, 2-ethylpropanediol-1,3, neopentyl glycol, pentanediol-1,5, hexanediol-1,6, cyclohexane-dimethanol-1,4, 3-methylpentanediol-2,4, 2-methyl-pentanediol-2,4, 2,2,4-trimethylpentanediol-1,3, and -1,6, 2-ethylhexanediol-1,3, 2,2-diethylpropanediol-1,3, hexanediol-2,5, 1,4-di-(β-hydroxyethoxy)-benzene, 2,2-bis-(4-hydroxycyclohexyl)-propane, 2,4-dihydroxy-1,1,3,3-tetra-methyl-cyclobutane, 2,2-bis-(3-β-hydroxyethoxyphenyl)-propane and 2,2-bis-(4-hydroxypropoxyphenyl) -propane (DE-OS 24 07 674, 24 07 776, 27 15 932).

The polyalkyleneterephthalates may be branched by incorporating relatively small amounts of 3- or 4-hydric alcohols or 3- or 4-basic carboxylic acids, such as are described, for example, in DE-OS 19 00 270 and U.S. Pat. No. 3 692 744. Examples of preferred branching agents comprise trimesic acid, trimellitic acid, trimethylol-ethane and -propane and pentaerythritol.

It is recommended that not more than 1 mol-% of branching agent, with respect to the acid component, be used.

Polyalkyleneterephthalates which have been prepared solely from terephthalic acid and its reactive derivatives (e.g. its dialkyl etsers) and ethylene glycol and/or butanediol-1,4 (polyethyleneterephthalate and polybutyleneterephthalate) and mixtures of these polyalkyleneterephthalates are particularly preferred.

Copolyesters which are prepared from at least two of the acid components mentioned above and/or at least two of the alcohol components mentioned above are also preferred polyalkylene-terephthalates, poly(ethylene glycol/butanediol-1,4) -terephthalates being particularly preferred copolyesters.

Polyalkyleneterephthalates preferably used as component A generally have an intrinsic viscosity of ca. 0.4 to 1.5 dl/g, preferably 0.5 to 1.3 dl/g, each measured in phenol/o-dichlorobenzene (1:1 by wt.) at 25° C.

Component B

Suitable thermoplastic aromatic polycarbonates in accordance with component B according to the invention are those based on diphenols of the formula (II)

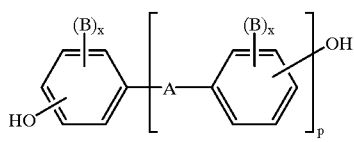

(II)

in which
A is a single bond, a $C_1$–$C_5$-alkylene, $C_2$–$C_5$-alkylidene or $C_5$–$C_6$-cycloalkylidene group, —S— or —$SO_2$—,
B is chlorine or bromine,
x is 0, 1 or 2 and
p is 1 or 0,
or alkyl-substituted dihydroxyphenylcycloalkanes of the formula (III),

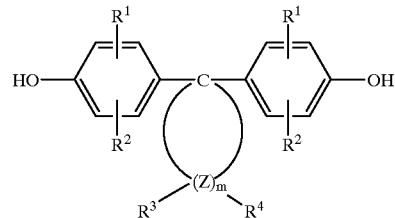

(III)

in which
$R^1$ and $R^2$, independently of each other, represent hydrogen, a halogen, preferably chlorine or bromine, a $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, in particular benzyl, group,
m is an integer from 4 to 7, preferably 4 or 5,
$R^3$ and $R^4$, independently of each other, represent hydrogen or a $C_1$–$C_6$-alkyl group and are individually selectable for each Z, and
z represents carbon, with the proviso that $R^3$ and $R^4$ simultaneously represent an alkyl group on at least one Z atom.

Suitable diphenols of the formula (II) are, for example, hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-cyclohexane, 2,2-bis-(3-chloro-4-hydroxyphenyl)-propane, 2,2-bis-(3,5-dibromo-4-hydroxy-phenyl)-propane.

Preferred diphenols of the formula (II) are 2,2-bis-(4-hydroxyphenyl)-propane, 2,2-bis-(3,5-dichloro-4-hydroxyphenyl) -propane and 1,1-bis- (4-hydroxyphenyl) -cyclohexane.

Preferred diphenols of the formula (III) are 1,1-bis-(4-hydroxyphenyl)-3,3-dimethylcyclohexane, 1,1-bis-(4-hydroxyphenyl)-3,3,5-trimethylcyclohexane and 1,1-bis-(4-hydroxyphenyl)-2,4,4-trimethylcyclopentane.

Suitable polycarbonates according to the invention are either homopolycarbonates or copolycarbonates.

Component B may also be a mixture of the previously defined thermoplastic polycarbonates.

The aromatic polycarbonates may be prepared by known methods, for instance by melt transesterification of an appropriate bisphenol and diphenyl carbonate and in solution from bisphenols and phosgene. The solution may be homogeneous (pyridine process) or heterogeneous (two-phase interface process) (cf. H. Schnell, "Chemistry and Physics of Polycarbonates", Polymer Reviews, vol. IX, p. 33 et seq., Interscience Publ. 1964). The moleularweight may be adjusted in a known manner by using an appropriate amount of a known chain-terminator. Suitable chain-terminators are, for instance, phen ol, p-chlorophenol, p-tert.butylphenol or 2,4,6-tribromophenol, and also long-chain alkyl phenols in accordance with DE-OS 2 842 005 or monoalkylphenols or dialkyl with a total of 8 to 20 carbon atoms in the alkyl substituents (DE-OS 3 506 472) such as 3,5-di-tert.butylphenol, p-iso-octylphenol, p-tert.octylphenol, p-dodecylphenol and 2-(3,5-dimethylheptyl)-phenol and 4-(3,5-dimethylheptyl)-phenol.

The amount of chain-terminator is in general between 0.5 and 10 mol-%, with respect to the sum of each of the diphenols with formulas (II) and/or (III) used.

The aromatic polycarbonates generally have a molecular weight $\overline{M}_w$ of about 10 000 to 200 000, preferably 20 000 to 80 000 (determined by gel chromatography following previous calibration).

Suitable polycarbonates A according to the invention may be branched in a known way, in fact preferably by the incorporation of 0.05 to 2 mol-%, with respect to the sum of the diphenols used, of trifunctional compounds or more than trifunctional compounds, e.g. those with three or more phenolic groups.

Copolycarbonates in the sense of the invention are also polydiorganosiloxane/polycarbonate block copolymers with average molecular weights $\overline{M}_w$ of about 10 000 to 200 000, preferably 20 000 to 80 000 (determined by gel chromatography following previous calibration) and with a content of aromatic carbonate structural units of about 75 to 97.5 wt. %, preferably 85 to 97 wt. %, and a content of polydiorganosiloxane structural units of about 25 to 2.5 wt. %, preferably 15 to 3 wt. %, wherein the block copolymers are prepared from polydiorganosiloxanes with α, ω-bis-hydroxyaryloxy terminal groups and a degree of polymerisation $P_n$ of 5 to 100, preferably 20 to 80.

Polydiorganosiloxane/polycarbonate block copolymers may also be a mixture of polydiorganosiloxane/polycarbonate block copolymers with conventional, polysiloxane-free thermoplastic polycarbonates, wherein the total amount of polydiorganosiloxane structural units in this mixture is ca. 2.5 to 25 wt. %.

These types of polydiorganosiloxane/polycarbonate block copolymers are characterised in that it contains polymer chains of on the one hand aromatic carbonate structural units (1) and on the other hand polydiorganosiloxanes with terminal aryloxy groups (2)

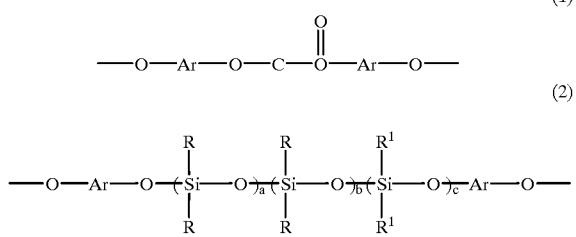

in which
Ar represents identical or different aryl groups from diphenols and
R and R¹ are identical or different and represent linear alkyl, branched alkyl, alkenyl, halogenated linear alkyl, halogenated branched alkyl, aryl or halogenated aryl groups, preferably, however, methyl, and the number of diorganosiloxy units n=a+b+c=5 to 100, preferably 20 to 80.

Alkyl in the preceding formula (2) is for example a $C_1$–$C_{20}$-alkyl group, alkenyl in the preceding formula (2) is for example a $C_2$–$C_6$-alkenyl group, aryl in the preceding formula (2) is for example a $C_6$–$C_{14}$-aryl group. Halogenated in the preceding formula means partially or completely chlorinated, brominated or fluorinated.

Examples of alkyl, alkenyl, aryl, halogenated alkyl and halogenated aryl groups are methyl, ethyl, propyl, n-butyl, tertbutyl, vinyl, phenyl, naphthyl, chloromethyl, perfluorobutyl, perfluorooctyl and chlorophenyl.

This type of polydiorganosiloxane/polycarbonate block copolymer is known, for example from U.S. Pat. No. 3 189 662, U.S. Pat. No. 3 821 325 and U.S. Pat. No. 3 832 419.

Preferred polydiorganosiloxane/polycarbonate block copolymers are prepared by reacting polydiorganosiloxanes containing α, ω-bis-hydroxyaryloxy groups together with other diphenols, optionally using branching agents in conventional amounts, for instance by the two-phase interface process (see, H. Schnell, Chemistry and Physics of Polycarbonates, Polymer Rev., vol. IX, p. 22 et seq., Interscience Publishers New York, 1964), wherein the ratio of each of the bifunctional phenolic reactants is selected in such a way that the amount of aromatic carbonate structural units and diorganosiloxy units according to the invention is produced therefrom.

This type of polydiorganosiloxane containing α, ω-bis-hydroxyaryloxy terminal groups is known, e.g. from U.S. Pat. No. 3 419 634.

Component C

The rubber-elastic polymers include copolymers, especially graft copolymers, with rubber-elastic properties which are essentially obtainable from at least 2 of the following monomers:

chloroprene, isoprene, isobutene, styrene, acrylonitrile, ethylene, propylene, vinylacetate and (meth)acrylates with 1 to 18 carbon atoms in the alcohol component; that is polymers like those described, for example, in "Methoden der organischen Chemie" (Houben-Weyl), vol. 14/1, Georg-Thieme Verlag, Stuttgart 1961, p. 393 to 406 and in C. B. Bucknall, "Toughened Plastics", Appl. Science Publishers, London 1977. The polymers have a gel content of more than 20, preferably more than 40 wt. %. The glass transition temperature (Tg) is below −20° C.

Preferred polymers are selectively hydrogenated X–Y type block copolymers of a vinyl-aromatic monomer (X) and a conjugated diene (Y). These block copolymers may be prepared by known processes.

In general, to prepare the appropriate X–Y block copolymer from styrene, α-methylstyrene, vinyltoluene, etc, and from conjugated dienes such as butadiene, isoprene, etc, the technology used is that described for preparing styrene/diene block copolymers in "Encyclopedia of Polymer Science and Technology", vol. 15, Interscience, N.Y. (1971) on pages 508 et seq. Selective hydrogenation can be performed in ways known per se and means that the ethylenic double bonds are essentially completely hydrogenated, wherein the aromatic double bonds are essentially left untouched.

This type of selectively hydrogenated block copolymer is described, for example, in DE-OS 3 000 282.

Preferred polymers are, for instance, polybutadiene grafted with styrene and/or acrylonitrile and/or alkyl (meth)-acrylates, butadiene/styrene copolymers and poly(meth)-acrylates e.g. copolymers of styrene or alkylstyrene and conjugated dienes (impact resistant polystyrene), i.e. copolymers of the type described in DE-OS 1 694 173 (=U.S. Pat. No. 3 564 077), with acrylate or methacrylate, vinylacetate, acrylonitrile, styrene and/or alkylstyrene grafted polybutadiene, butadiene/styrene or butadiene/acrylonitrile copolymers, polyisobutenes or polyisoprenes, like those described, for example, in DE-OS 2 348 377 (=U.S. Pat. No. 3 919 353) or in DE-A 3 105 364 and DE-A 3 019 233.

Particularly preferred polymers are, for example, ABS polymers (mixtures and graft-type) such as are described, for instance, in DE-OS 2 035 390 (=U.S. Pat. No. 3 644 574) or in DE-OS 2 248 242 (=GB-PS 1 409 275). By way of example, the following graft polymers may be mentioned, these consisting of C.1) 5 to 95, preferably 30 to 80 parts by wt. of a mixture of
- C.1.1) 50 to 95 parts by wt. of styrene, α-methylstyrene, halogen or methyl nuclear-substituted styrene, $C_1$–$C_8$-alkylmethacrylate, in particular methylmethacrylate, $C_1$–$C_8$-alkylacrylate, in particular methylacrylate, or mixtures of these compounds and
- C.1.2) 5 to 50 parts by wt. of acrylonitrile, methacrylonitrile, $C_1$–$C_8$-alkylmethacrylates, in particular methylmethacrylate, $C_1$–$C_8$-alkylacrylate, in particular methylacrylate, maleic anhydride, $C_1$–$C_4$-alkyl or phenyl-N-substituted maleic imide or mixtures of these compounds on C.2) 5 to 95, preferably 20 to 70 parts by wt. of a polymer with a glass transition temperature below –10° C., in particular polybutadiene or a butadiene/styrene copolymer.

In addition, particularly preferred polymers are graft polymers which are obtainable by graft reacting I. 10 to 40, preferably 10 to 35 wt. %, with respect to the graft product, of at least one (meth)acrylate and/or a mixture of 10 to 40, preferably 20 to 35 wt. %, with respect to the mixture, of acrylonitrile and 60 to 90, preferably 65 to 80 wt. %, with respect to the mixture, of styrene onto II. 60 to 90, preferably 65 to 90 wt. %, with respect to the graft product, of a butadiene polymer with at least 70 wt. %, with respect to II, of butadiene groups as the graft substrate, wherein the gel content of graft substrate II is preferably >70% (measured in toluene), the degree of grafting G is preferably 0.15 to 0.55 and the average particle diameter $d_{50}$ of graft polymer C is 0.2 to 0.6 μm, preferably 0.3 to 0.5 μm (see e.g. EP 0 131 202).

(Meth)acrylates I are esters of acrylic acid or methacrylic acid and monohydric alcohols with 1 to 8 carbon atoms.

Graft substrate II may contain, in addition to butadiene groups, up to 30 wt. %, with respect to II, of groups from other ethylenically unsaturated monomers such as, for instance, styrene, acrylonitrile, esters of acrylic or methacrylic acid with 1 to 4 carbon atoms in the alcohol component (such as methylacrylate, ethylacrylate, methylmethacrylate, ethylmethacrylate). The preferred graft substrate II consists of pure polybutadiene.

Since, as is known, graft monomers I do not fully graft onto graft substrate II during the grafting reaction, graft polymers according to the invention are understood to include those products which also contain homopolymers and copolymers of the graft monomers I used, in addition to the actual graft polymers.

The degree of grafting G refers to the ratio by wt. of grafted-on graft monomers to graft substrate and is dimensionless.

The average particle size $d_{50}$ is the diameter above and below which 50% respectively of the particles are located. It can be determined by means of ultracentrifuge measurements (W. Scholtan, H. Lange, Kolloid, Z. und Z. Polymere 250 (1972), p. 782–796) or by means of electron microscopy and subsequent particle counting (C. Kämpf, H. Schuster, Angew. Makromolekulare Chemie 14, (1970), p. 111–129) or by means of light scattering measurements.

Particularly preferred rubber elastic polymers are also, for instance, graft polymers made from
a) 25 to 98 wt. %, with respect to 100 wt. % of graft polymer, of polyacrylate rubber with a glass transition temperature below –20° C. as graft substrate and
b) 2 to 75 wt. %, with respect to 100 wt. % of graft polymer, of at least one polymerisable, ethylenically unsaturated monomer, whose homopolymers or copolymers, produced in the absence of (a), have a glass transition temperature of 25° C., as graft monomers.

Polyacrylate rubbers (a) are preferably polymers of alkyl acrylates, optionally with up to 40 wt. % of other polymerisable, ethylenically unsaturated monomers. If the polyacrylate rubbers used as graft substrate (a), as described in the following, are already for their part graft rubbers with a diene rubber core, the diene rubber core is not included when calculating this percentage. Included among the preferred polymerisable acrylates are $C_1$–$C_8$-alkyl esters, for example methyl, ethyl, butyl, octyl and 2-ethylhexyl esters; haloesters, preferably halogen-$C_1$–$C_8$-alkyl esters such as chloroethylacrylate and aromatic esters such as benzylacrylate and phenylethylacrylate. They may be used separately or as a mixture.

The polyacrylate rubbers (a) may be non-cross-linked or cross-linked, preferably partially cross-linked.

Monomers with more than one polymerisable double bond may be copolymerised to produce cross-linking. Preferred examples of cross-linking monomers are esters of unsaturated monocarboxylic acids with 3 to 8 carbon atoms or saturated polyols with 2 to 4 OH groups and 2 to 20 carbon atoms such as for instance, ethylene glycol dimethacrylate, allyl methacrylate, polyunsaturated heterocyclic compounds such as, for instance, trivinyl and triallyl cyanurate and isocyanurate, tris-acryloyl-s-triazine, in particular triallyl cyanurate; polyfunctional vinyl compounds such as di and trivinylbenzene; and also triallyl phosphate and diallyl phthalate.

Preferred cross-linking monomers are allyl methacrylate, ethylene glycol dimethacrylate, diallyl phthalate and heterocyclic compounds which contain at least 3 ethylenically unsaturated groups.

Particularly preferred cross-linking monomers are the cyclic monomers triallyl cyanurate, triallyl isocyanurate, trivinyl cyanurate, triacryloylhexahydro-s-triazine and triallylbenzene.

The amount of cross-linking monomers is preferably 0.02 to 5, in particular 0,05 to 2 wt. %, with respect to graft substrate (a).

In the case of cyclic cross-linking monomers with at least 3 ethylenically unsaturated groups, it is advantageous to restrict the amount to <1 wt. % of graft substrate (a).

Preferred "other polymerisable, ethylenically unsaturated monomers" which may optionally be used to prepare graft substrate (a) in addition to acrylates are, for instance, acrylonitrile, styrene, a-methylstyrene, acrylamide, or vinyl-$C_1$–$C_6$-alkyl ethers. Preferred polyacrylate rubbers for graft substrate (a) are emulsion polymers which have a gel content of ≧60 wt. %.

The gel content of graft substrate (a) is determined at 25° C. in dimethylformamide (M. Hoffmann, H. Krämer, R. Kuhn, Polymeranalytik I and II, Georg-Thieme Verlag, Stuttgart 1977).

Polyacrylate rubbers as graft substrate (a) may also be products which contain a cross-linked diene rubber made from one or more conjugated dienes with an ethylenically unsaturated monomer such as styrene and/or acrylonitrile, as core.

The content of polydiene core in graft substrate (a) may be 0.1 to 80, preferably 10 to 50 wt. %, with respect to (a). Envelope and core may, independently of each other, be noncross-linked, partially or highly cross-linked.

The previously mentioned graft polymers made from polybutadiene as graft substrate and with a (meth)acrylate and acrylonitrile as graft envelope, wherein the graft substrate consists of 65 to 90 wt. % cross-linked polybutadiene with a gel content of more than 70% (in toluene) and a graft envelope made from a 5:1 to 20:1 mixture of methylmethacrylate and n-butylacrylate are quite particularly preferred e.g. DE 3 105 364, DE 3 019 233).

Component D

The polymer mixtures according to the invention contain an oligomeric phosphate of the formula (Ia):

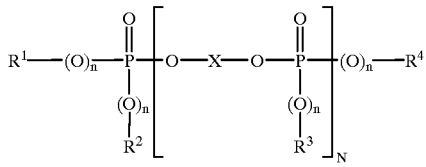

(Ia)

In the formula, $R^1$, $R^2$, $R^3$ and $R^4$, independently of each other, represent a $C_1$–$C_8$-alkyl, $C_5$–$C_6$-cycloalkyl, $C_6$–$C_{10}$-aryl or $C_7$–$C_{12}$-aralkyl group, $C_6$–$C_{10}$-aryl or $C_7$–$C_{12}$-aralkyl groups being preferred. Aromatic groups $R^1$, $R^2$, $R^3$ and $R^4$ may for their part be substituted with halogen or alkyl groups. Particularly preferred aryl groups are cresyl, phenyl, xylenyl, propylphenyl or butylphenyl, and also the brominated and chlorinated derivatives thereof.

X in formula (Ia) represents a mono or polynuclear aromatic group with 6 to 30 carbon atoms. This is derived from diphenols such as e.g. bisphenol A, resorcinol or hydroquinone, or also the chlorinated or brominated derivatives thereof.

Any n in formula (Ia) may independently be 0 to 1, preferably n is 1.

N may assume the values 1, 2, 3, 4 or 5, and is preferably between 1 and 2. Component D according to the invention may also be mixtures of different oligomeric phosphates. In this case N has an average value between 1 and 5.

m-Phenylene-bis(diphenylphosphate) with N equal to 1 or 2 or values between 1 and 2 is in particular preferred as phosphorus compound of formula (Ia).

The compositions according to the invention may also contain a mixture of phosphorus compound(s) of the formula (Ia) and phosphorus compound(s) of the formula (Ib)

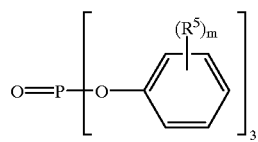

(Ib)

in which
$R^5$ and m have the above mentioned meaning.

Triphenylphosphate is preferably used as phosphorus compound of the formula (Ib).

The phosphorus compounds can be prepared according to general known processes (see for example Ullmann, Enzyklopädie der Technischen Chemie, Vol. 18, page 301 ff (1979); Houben-Weyl, Methoden der organichen Chemie, Vol. 12/1, page 43; Beilstein Vol. 6, page 177).

Component E1

Suitable mineral fillers which may be used are hydrated or anhydrous carbonates or sulphates of metals from group 2A of the periodic system such as, for instance, magnesium calcium carbonate hydrate, calcium carbonate, magnesium carbonate, calcium sulphate, hydroxides of metals from groups 2 and 3 in the periodic system such as, for instance, calcium hydroxide, magnesium hydroxide or aluminium hydroxide, also gypsum or hydrotalcite. The mineral fillers may be used on their own or in combination. They may also be surface-treated with aminosilanes or epoxides.

Magnesium calcium carbonate may be either hydrated or anhydrous, for instance naturally occurring minerals such as dolomite and huntite.

Basic magnesium carbonate may also be used in the hydrated or anhydrous form, for instance the naturally occurring hydrated mineral hydromagnesite ($Mg_5(CO_3)_4$ $(OH)_2$ –$4H_2O$).

Carbonates and sulphates of metals from group 2A are preferred. Magnesium calcium carbonate hydrate is particularly preferred.

Magnesium calcium carbonate hydrate used in accordance with this invention is a commercially available natural mineral with or without a surface treatment. Aminosilanes are generally used for surface treatment purposes. Finely divided (0.4–10 microns) Mg—Ca carbonate hydrate, such as for example, Securoc® PBT/PP (Incemin AG) may be used.

Component E2

The mineral-filled moulding compounds may also contain up to 60, preferably 10 to 40 wt. %, with respect to the filled moulding compound, of reinforcing materials. Glass fibres, which in general have a fibre diameter between 8 and 14 μm, may be used as infinite fibres or as cut up or milled glass fibres, wherein the fibres may be provided with an. appropriate size system and a coupling agent or coupling system based on silane.

Fillers which may also act as reinforcing agents, are, for instance, glass beads, mica, silicates, quartz, talc, titanium dioxide, wollastonite. These fillers may also, like the glass fibres, be provided with a size and/or a coupling agent or coupling system.

Glass fibres are preferred.

The moulding compounds according to the invention may also contain conventional additives such as lubricants, mould release agents, nucleating agents, antistatic agents, stabilisers and colorants and pigments.

Moulding compounds according to the invention, consisting of components A to E and optionally other known additives such as stabilisers, colorants, pigments, lubricants, mould release agents, reinforcing materials, nucleating agents and antistatic agents are prepared by mixing the relevant constituents in a known manner and melt-compounding or melt-extruding generally at temperatures of 230° C. to 330° C. in conventional equipment such as internal mixers, extruders and twin screw extruders.

The invention thus also provides a process for preparing thermoplastic moulding compounds consisting of components A to E and optionally stabilisers, colorants, pigments, lubricants, mould release agents, fillers and reinforcing materials, nucleating agents and antistatic agents, characterised in that components A to E and optionally stabilisers, colorants, pigments, flow controllers, fillers and reinforcing materials, lubricants, mould release agents, nucleating agents and/or antistatic agents, after mixing, are melt compounded or melt extruded generally at temperatures of 230 to 330° C. in conventional equipment.

The moulding compounds in the present invention may be used to produce moulded items of any type, Moulded items produced from the moulding compounds may be components for the electrical sector, for which a high degree of toughness and simultaneous good flow properties, without damaging the thermoplastic matrix, are desired.

Thus, they may be used, for instance for housing parts, edge connectors and lamp bases as well as parts for the motor vehicle sector.

EXAMPLES

Component A

Polybutyleneterephthalate with a relative viscosity of 1.185 measured in a 0.5% strength solution of phenol and o-dichlorobenzene (ratio by wt. in the mixture 1:1).

Component D m-phenylene-bis- (diphenyl phosphate) (Fyroflex® RDP from Akzo)

Component E1

Magnasium calcium carbonate hydrate (Securoc® PBT/IPP, Incemin AG), loss on roasting at 1050° C.=54%, Cal-content=40%, Ca content=5.5%).

Component E2

Glass fibres: Owens Corning Type OC 29 R.

The components given in the examples are mixed and processed to give test items in an injection moulding machine under conventional PBT processing conditions (melt temperature about 260° C.).

The properties of these test items were then tested.

| | Ex. A Comp. | Ex. 1 | Ex. 2 | Ex. B Comp. | Ex. 3 | Ex. 4 | Ex. 5 | Ex. C Comp. | Ex. 6 | Ex. D Comp. | Ex. 7 | Ex. E Comp. | Ex. 8 |
|---|---|---|---|---|---|---|---|---|---|---|---|---|---|
| PBT | 69.4 | 66.4 | 62.4 | 41.5 | 40.5 | 38.5 | 36.5 | 54.5 | 51.5 | 49.5 | 46.5 | 44.5 | 41.5 |
| Securoc PBT/PP | 30.0 | 30.0 | 30.0 | 50.0 | 50.0 | 50.0 | 50.0 | 45.0 | 45.0 | 50.0 | 50.0 | 55.0 | 55.0 |
| Stabiliser[1] | 0.1 | 0.1 | 0.1 | — | — | — | — | — | — | — | — | — | — |
| Mould release aid[2] | 0.5 | 0.5 | 0.5 | 0.5 | 0.5 | 0.5 | 0.5 | 0.5 | 0.5 | 0.5 | 0.5 | 0.5 | 0.5 |
| Glass fibres[3] | — | — | — | 8.0 | 8.0 | 8.0 | 8.0 | — | — | — | — | — | — |
| Fyroflex RDP | — | 3.0 | 7.0 | — | 1.0 | 3.0 | 5.0 | — | 3.0 | — | 3.0 | — | 3.0 |
| Results | | | | | | | | | | | | | |
| 1. Outer fibre strain at maximum force from flexural test 5 mm/min. ISO 178, DIN 53452, rod 80 × 10 × 4 mm (%) | 3.7 | 5.7 | 6.0 | 1.4 | 1.6 | 1.8 | 2.2 | 2.2 | 2.8 | 1.5 | 2.2 | 1.4 | 2.1 |
| 2. Flexural stress at maximum force, 5 mm/min. ISO 178, DIN 53452, rod 80 × 10 × 4 mm (N/mm²) | 109 | 96 | 75 | 120 | 128 | 123 | 111 | 111 | 98 | 101 | 90 | 99 | 93 |
| 3. Modulus of elasticity (3-pt. flexural test), 2 mm/min. DIN 53457-B3, rod 80 × 10 × 4 mm (N/mm²) | 4850 | 3790 | 3010 | 10300 | 10400 | 9320 | 7590 | 6950 | 5720 | 8300 | 6030 | 8600 | 6910 |
| 4. Impact resistance (IZOD), 23° C., ISO 180/1U, rod 80 × 10 × 4 mm (kJ/m²) | 29 | 32 | 29 | 18 | 22 | 22 | 24 | 24 | 24 | 18 | 21 | 15 | 21 |

[1] Phosphite stabiliser
[2] E-wax
[3] Glass fibres type OCR Owens Corning

What is claimed is:

1. Thermoplastic moulding compounds consisting of:
   A) 30 to 98.9 parts by wt. of polyalkyleneterephthalate;
   C) 0 to 30 parts by wt. of a graft polymer;
   D) 0.1 to 20 parts by wt. of an oligomeric phosphorus compound of the formula (Ia)

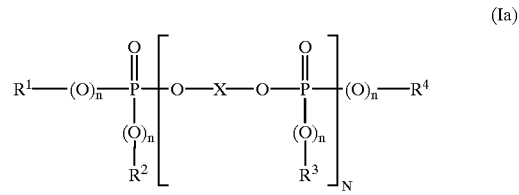

(Ia)

in which
R¹, R², R³, R⁴, independently of each other, represent a $C_1-C_8$-alkyl, $C_5-C_6$-cycloalkyl, $C_6-C_{10}$-aryl or $C_7-C_{12}$-aralkyl group,
n may be 0 or 1, irrespective of the position,
n is an average number from 0.5 to 5 and
x represents a mono or polynuclear aromatic group with 6 to 30 carbon atoms,
or 0.1 to 20 parts by weight of a mixture of an oligomeric phosphorus compound of the formula (Ia) and a phosphorus compound of the formula (Ib)

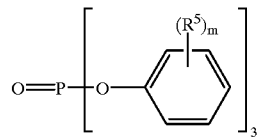

R⁵ is methyl and m is a number of 0 to 5, where the amount of phosphorus compound of the formula (Ib) in the mixture of phosphorus compounds is 1 to 50% by weight, relative to 100% by weight of phosphorus compound of the formulae (Ia) and (Ib);

E1) 1 to 60 parts by wt. of magnesium calcium carbonate hydrate;

E2) 0 to 30 parts by wt. of fillers and reinforcing materials selected from the group consisting of glass fibers, glass beads, mica, silicates, quartz, talc, titanium dioxide and wollastonite and optionally one or more of lubricants, mold release agents, nucleating agents, antistatic agents, stabilizers, colorants or pigments.

2. The molding compound of claim 1, consisting of 30–92 parts of A), 1–20 parts of D), 1 to 60 parts of E1), and 1–20 parts of E2).

3. The molding compound of claim 1, consisting of 30–97 parts of A), 5–30 parts of C), 1–20 parts of D), 1 to 60 parts of E1), and 5–20 parts of E2).

* * * * *